United States Patent [19]
von Blucher et al.

[11] Patent Number: 5,277,963
[45] Date of Patent: Jan. 11, 1994

[54] FILTER SHEET MATERIAL

[75] Inventors: Hasso von Blucher, Erkrath; Ernest de Ruiter, Leverkusen, both of Fed. Rep. of Germany

[73] Assignee: Blucher GmbH, Erkrath, Fed. Rep. of Germany

[21] Appl. No.: 21,429

[22] Filed: Feb. 23, 1993

[30] Foreign Application Priority Data

Feb. 25, 1992 [DE] Fed. Rep. of Germany ....... 4205648
Dec. 19, 1992 [DE] Fed. Rep. of Germany ....... 4243232

[51] Int. Cl.$^5$ .................. B32B 27/14; B32B 5/16; B01J 20/26; C08K 9/00
[52] U.S. Cl. ..................... 428/206; 428/196; 428/323; 502/402; 523/205; 523/207; 526/347; 526/347.1; 604/368
[58] Field of Search .............. 428/196, 206, 323; 604/368; 526/347, 347.1; 502/402; 523/205, 207

[56] References Cited

U.S. PATENT DOCUMENTS

| | | | |
|---|---|---|---|
| 4,392,908 | 7/1983 | Dehnel | 428/311.1 |
| 4,455,187 | 6/1984 | Blücher et al. | 428/196 |
| 4,510,193 | 4/1985 | Blucher et al. | 428/196 |

Primary Examiner—George F. Lesmes
Assistant Examiner—Kathryne E. Shelborne
Attorney, Agent, or Firm—Sprung Horn Kramer & Woods

[57] ABSTRACT

A filter material suitable for making protective clothing comprising an air-permeable pliable textile support, substantially spherical adsorber particles, and an adhesive discontinuously securing said particles to said textile support, wherein the adsorber particles comprise a copolymer based mainly on styrene and divinylbenzene, eventually crosslinked by $CH_2$-bridges.

7 Claims, No Drawings

FILTER SHEET MATERIAL

The standard NBC protection for the body of a soldier is an air permeable overgarment. Since sweat can be evacuated the same way as in ordinary textile such garments can be worn without any time limits. To prevent toxic agents from penetrating and reaching the skin a permeable overgarment always possesses a filter which adsorbs toxic agents. Up to the present time only activated carbon has been used for this purpose and it was thought that other adsorbents would fail. Activated carbon is present either as a fine powder held together by a binder and supported by a nonwoven or a polyurethane foam or as particles smaller than 1 mm fixed on an air permeable textile material with the help of an adhesive in form of small dots. In the first case the powdered carbon is mixed with an aqueous binder dispersion and applied to the support by impregnation or spraying. In the second case—and this is actually the preferred technique—ball shaped carbon particles having a diameter of about 0.3–0.7 mm are applied to a textile support covered on one side by small dots of a special adhesive as described in U.S. Pat. No. 4,510,193.

It has been found and this is the main part of this invention—that so-called "porous polymers" of a special type can be used instead of the ball-shaped activated carbon particles described in U.S. Pat. No. 4,510,193 having an even better capacity for toxic agents, but permitting a better decontamination.

Porous polymers are prepared in the same way as exchange, resins using emulsion polymerization of styrene and some divinylbenzene (DVB), but have no functional groups. They are well described in European Patent 0 388 140 A1. If the polymer contains only small amounts of DVB (<2%), the polymer swells in methylene chloride and can be crosslinked by this chemical in the swollen state. Free spaces between the polymer chains can be compared to the micropores of activated carbon. The spherical absorbers are built-up from a very large number of microspheres of a few hundred to a few thousand Å in diameter resulting form the microdroplets of the starting emulsion. Spaces between the microspheres can be compared wit the mesopores of activated carbon. Nevertheless, there is a big difference between activated carbon and other absorbers and "porous polymers". In classical absorbers there is an adsorption of molecules on a surface, the driving forces being of the van den Waals type. In the porous polymer there is some kind of dissolution of the molecules in the mass of the polymer.

Generally speaking there are two types of polymer absorbers: the gel type and the macroporous type, the latter being opaque. The reason for this optical difference is that pores in the gel-type are smaller than the wavelengths of light so they cannot be seen. The chemical difference is mainly a higher degree of crosslinking in the case of the macroporous type. It has been found that the macroporous type has a slightly lower capacity, but somewhat better kinetics. As a result of the less smooth surface, the bonding to the adhesive is very strong.

Gel-type polymeric absorbers can be obtained from DOW Chemical Company (Sorbathene) and Rhöm and Haas Company (Ambersorb). Macroporous polymeric absorbers can be obtained from Novel-Chematur (Bonopore).

In the filter described in U.S. Pat. No. 4,510,193 and known world-wide under the trademark SARATOGA ™, activated carbon spheres with a diameter of 0.2–1.0 mm, in particular 0.3–0.7 mm, and a bulk density of 0.55–0.60 gm/cm$^3$ are used. An amount of activated carbon of up to 220/g/m$^2$ can be realized. By contrast, due to the lower bulk density of porous polymers (about 0.45 for the gel type and 0.35–0.40 g/cm$^3$ for the macroporous type) the amount of absorbers per m$^2$ reaches only 150–180 g/m$^2$. Due to the higher adsorption capacity, however, the adsorption performance of the filter is at least comparable to filters based on activated carbon. Although the activated carbon spheres are less hydrophilic than most activated carbons available, porous polymers are still less hydrophilic. As a result they offer better protection under extreme wet conditions.

EXAMPLE

An amount of 50 g/m$^2$ of a special adhesive was printed (rotary printing device, 25 mesh) on a cotton tissue (100 g/m$^2$). The adhesive consisted of 1000 parts Impranil HS 62 and 62 parts Imprafix HS-C, both products of Bayer AG, Leverkusen, Germany, and formed small dots of a diameter of 0.3 mm and a height of 0.15 mm, having the shape of a hemisphere. Then the absorbers were applied and the adhesive was crosslinked at 150° C. Three types of adsorbers were used:

1) Spheres of activated carbon made from pitch having a diameter of 0.56–0.63 mm and internal surface area of 1100 m$^2$/g leading to a coverage of 780 g/m$^2$.
2) Porous polymers of the gel-type (diameter of 0.4–0.5 mm) leading to a coverage of 130 g/m$^2$.
3) Porous polymers of the macroporous type (diameter of 0.5–0.7 mm) leading to a coverage of 145 g/m$^2$.

The three samples were compared using a dynamic method based on mustard gas. An airstream hits the sample at a linear velocity of 1.1 cm/s . It contains 20 mg of mustard/m$^3$. Thus the 1.5 cm$^2$ surface of the sample is exposed to 120 μg/h.

The breakthrough is measured after 30 min and thereafter every hour.

| TIME (h) | BREAKTHROUGH (μg) | | |
|---|---|---|---|
| | SAMPLE 1 | SAMPLE 2 | SAMPLE 3 |
| 0–0.5 | 0.93 | 0.92 | 0.54 |
| 0.5–1.5 | 4.09 | 3.42 | 3.82 |
| 1.5–2.5 | 4.15 | 4.52 | 3.90 |
| 2.5–3.5 | 4.64 | 4.93 | 3.88 |
| 3.5–4.5 | 4.33 | 4.36 | 4.16 |
| 4.5–5.5 | 4.43 | 4.18 | 4.70 |
| 5.5–6.5 | 4.33 | 4.34 | 3.00 |

All samples meet NATO standards but sample 3 is best. Furthermore, the weight capacity as measured with heptanoic acid—a simulans for toxic agents—was 45%, 65% and 60% respectively.

It will be appreciated that the instant specification and claims are set forth by way of illustration and not limitation, and that various modifications and changes may be made without departing from the spirit and scope of the present invention.

What is claimed is:

1. In a filter material, suitable for making protective clothing, comprising an air-permeable pliable textile support, substantially spherical adsorber particles, and an adhesive discontinuously securing said particles to said textile support, the improvement wherein said adsorber particles comprise a copolymer based mainly on styrene and divinylbenzene, eventually crosslinked by CH$_2$-bridges.

2. A filter material according to claim 1, wherein the polymer particles are of the gel-type.

3. A filter material according to claim 1, wherein the polymer particles are of the macroporous type.

4. A filter material according to claim 1, wherein the polymer particles are about 0.1 to 1 mm in diameter.

5. A filter material according to claim 4, wherein the polymer particles are about 0.4 to 0.7 mm in diameter.

6. A filter material according to claim 3, wherein the polymer particles are about 0.4 to 0.7 mm in diameter.

7. A protective garment formed of a filter material according to claim 1.

* * * * *

UNITED STATES PATENT AND TRADEMARK OFFICE
CERTIFICATE OF CORRECTION

PATENT NO. : 5,277,963
DATED : January 11, 1994
INVENTOR(S) : von Blucher et al.

It is certified that error appears in the above-identified patent and that said Letters Patent is hereby corrected as shown below:

Col. 1, line 32    After " exchange " delete " , "

Col. 2, line 31    Delete " 780 " and substitute -- 180 --

Signed and Sealed this

Twelfth Day of July, 1994

*Attest:*

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,277,963
DATED : January 11, 1994
INVENTOR(S) : von Blucher et al.

It is certified that error appears in the above-indentified patent and that said Letters Patent is hereby corrected as shown below:

Col. 1, line 66   Delete " (Ambersorb) "

Signed and Sealed this

Thirteenth Day of December, 1994

Attest:

BRUCE LEHMAN

*Attesting Officer*   *Commissioner of Patents and Trademarks*